United States Patent
Shin

(10) Patent No.: US 10,094,455 B2
(45) Date of Patent: Oct. 9, 2018

(54) MULTIPURPOSE OPENING AND CLOSING DEVICE

(71) Applicant: Jong-Soo Shin, Chungcheongbuk (KR)

(72) Inventor: Jong-Soo Shin, Chungcheongbuk (KR)

( * ) Notice: Subject to any disclaimer, the term of this patent is extended or adjusted under 35 U.S.C. 154(b) by 226 days.

(21) Appl. No.: 14/906,856

(22) PCT Filed: Jun. 1, 2015

(86) PCT No.: PCT/KR2015/005453
§ 371 (c)(1),
(2) Date: Jan. 21, 2016

(87) PCT Pub. No.: WO2015/186933
PCT Pub. Date: Dec. 10, 2015

(65) Prior Publication Data
US 2016/0160967 A1    Jun. 9, 2016

(30) Foreign Application Priority Data

Jun. 2, 2014    (KR) .................. 10-2014-0067111

(51) Int. Cl.
*A24F 15/14*    (2006.01)
*F16H 21/44*    (2006.01)
(Continued)

(52) U.S. Cl.
CPC ............ *F16H 21/44* (2013.01); *A24F 15/14* (2013.01); *A45D 40/023* (2013.01); *B65D 25/005* (2013.01)

(58) Field of Classification Search
CPC ... A45D 2040/225; A45D 40/23; A24F 15/14; B65D 25/005
See application file for complete search history.

(56) References Cited

U.S. PATENT DOCUMENTS 1,467,627 A * 9/1923 Thimgren ............... A24F 15/14
                                                        221/232
1,575,121 A * 3/1926 Lyons ..................... A24F 15/14
                                                        221/232
(Continued)

FOREIGN PATENT DOCUMENTS

JP    2006-264776    10/2006
KR    10-0235666     12/1999
(Continued)

OTHER PUBLICATIONS

International Search Report dated Sep. 14, 2015, issued in PCT Application No. PCT/KR2015/005453, filed Jun. 1, 2015.

*Primary Examiner* — William Kelleher
*Assistant Examiner* — Gregory T Prather
(74) *Attorney, Agent, or Firm* — Workman Nydegger

(57) ABSTRACT

Disclosed herein is a multipurpose opening and closing device. The device includes a casing having an opening, a manipulation unit moved up and down in the casing by a user's manipulation, an opening and closing unit operated in conjunction with the up-and-down movement of the manipulation unit to open or close the opening, and a fixing unit intended to prevent the manipulation unit from deviating from a predetermined course when the manipulation unit is moved up and down, so that a structure where the opening is opened or closed by the opening and closing unit operated in conjunction with the manipulation unit is simplified, thus reducing a failure in the device, enabling easy repair, and allowing an interior space of the casing to be efficiently used.

21 Claims, 10 Drawing Sheets

(51) Int. Cl.
*B65D 25/00* (2006.01)
*A45D 40/02* (2006.01)

(56) References Cited

U.S. PATENT DOCUMENTS

| | | | | |
|---|---|---|---|---|
| 1,575,573 | A * | 3/1926 | Ernest | A24F 15/14 221/274 |
| 3,272,321 | A * | 9/1966 | Tamarin | A24F 15/14 206/249 |
| 3,667,650 | A * | 6/1972 | Noda | A24F 15/14 221/250 |
| 5,205,402 | A * | 4/1993 | Maeda | A24F 15/14 206/250 |
| 6,012,863 | A | 1/2000 | Sakurai | |
| 7,207,463 | B1 * | 4/2007 | Balko | A24F 15/14 221/247 |
| 2007/0246382 | A1 * | 10/2007 | He | A24F 15/14 206/250 |
| 2012/0024881 | A1 * | 2/2012 | Papaloizou | A24F 15/14 221/1 |
| 2012/0024882 | A1 * | 2/2012 | Houghton | A24F 15/14 221/1 |
| 2012/0080329 | A1 * | 4/2012 | Gonzalez | A24F 15/14 206/249 |
| 2014/0086661 | A1 * | 3/2014 | Adams | A45D 40/065 401/68 |
| 2015/0245654 | A1 * | 9/2015 | Memari | A24F 15/12 141/2 |
| 2017/0043999 | A1 * | 2/2017 | Murison | B67D 7/36 |

FOREIGN PATENT DOCUMENTS

| | | |
|---|---|---|
| KR | 20-0335636 Y1 | 12/2003 |
| KR | 10-2013-0010154 | 1/2013 |

* cited by examiner (a)          (b)

MULTIPURPOSE OPENING AND CLOSING DEVICE

TECHNICAL FIELD

The present invention relates to an opening and closing device that may be utilized for many purposes. More particularly, the present invention relates to a multipurpose opening and closing device, which includes a casing having an opening, a manipulation unit moved up and down in the casing by a user's manipulation, an opening and closing unit operated in conjunction with the up-and-down movement of the manipulation unit to open or close the opening, and a fixing unit intended to prevent the manipulation unit from deviating from a predetermined course when the manipulation unit is moved up and down, so that a structure where the opening is opened or closed by the opening and closing unit operated in conjunction with the manipulation unit is simplified, thus reducing a failure in the device, enabling easy repair, and allowing an interior space of the casing to be efficiently used.

BACKGROUND ART

A casing having a given shape requires an opening and closing device to open or close an inlet of the casing and thereby an article can be put into or taken out of the casing. Thus, the opening and closing device is used in various fields including small products such as a lipstick, an electronic cigarette, or a wastebasket, as well as in large facilities such as an industrial facility.

PATENT DOCUMENT

Korean Patent No. 10-1057774 (published on Aug. 19, 2011) entitled "Electronic Cigarette".

In the cited patent document, an opening and closing device is disclosed, which is configured such that an up-and-down moving means and an opening-and-closing means are operated in conjunction with each other to open or close an opening of a casing. However, this is problematic in that the up-and-down moving means and the opening-and-closing means are connected to each other via a gear or the like to be operated, so that a repair is difficult due to a large number of parts, and miniaturization is difficult due to a complicated internal structure.

Therefore, there is a need to develop an opening-and-closing means, which simplifies an operating structure to reduce failure and to enable easy repair, and minimizes a space occupied by an opening and closing unit in an opening and closing device to efficiently use an interior space of a product.

DISCLOSURE

Technical Problem

Accordingly, the present invention has been made keeping in mind the above problems occurring in the related art, and is intended to provide a multipurpose opening and closing device, which simplifies a structure where an opening is opened or closed by an opening and closing unit operated in conjunction with a manipulation unit, thus reducing failure in the device, in addition to enabling easy repair.

The present invention is intended to provide a multipurpose opening and closing device, which is designed to minimize a space occupied by an opening and closing unit in a casing, thus enabling efficient use of an interior space of the casing.

Further, the present invention is intended to provide a multipurpose opening and closing device, in which a manipulation unit is fixed by a fixing unit, so that the manipulation unit is smoothly operated without deviating from a moving course.

The present invention is intended to provide a multipurpose opening and closing device, which reduces the number of parts required to operate a manipulation unit and an opening and closing unit, so that it is easy to repair the device and a manufacturing cost thereof is low.

The objects of the present invention are not limited to the above-mentioned objects and it is possible to understand other objects of the present invention by the following description. Other objects of the present invention may become apparent based on embodiments of the present invention. Further, the objects of the present invention may be realized by means described in claims and a combination thereof.

Technical Solution

In order to achieve the above-described objects, the present invention is implemented by embodiments having the following configuration.

In an aspect of the invention, provided is a multipurpose opening and closing device, including a casing having an opening formed therein; a manipulation unit moved up and down in the casing by a user's manipulation; and an opening and closing unit operated in conjunction with an up-and-down movement of the manipulation unit to open or close the opening, whereby a structure where the opening is opened or closed by the opening and closing unit operated in conjunction with the manipulation unit is simplified.

According to an embodiment of the invention, the manipulation unit may include a bent protrusion that protrudes from a first side thereof and may be operated in conjunction with the opening and closing unit to rotate the opening and closing unit.

According to an embodiment of the invention, the manipulation unit may include a manipulation protrusion that protrudes from a second side thereof to be exposed to an outside of the casing, so that the manipulation unit may be moved up and down in the casing as a user may manipulate the manipulation protrusion.

According to an embodiment of the invention, the opening and closing unit may include a moving member rotated as the manipulation unit is moved up and down; a connecting member connected with the moving member and rotated in a direction opposite to a rotating direction of the moving member; and a door connected with the connecting member to open or close the opening as the connecting member rotates.

According to an embodiment of the invention, the moving member may be formed in a diamond shape to be smoothly rotated even in a small space within the casing.

According to an embodiment of the invention, the moving member may include a hook that may be formed on a lower portion thereof to be bent, may be connected with the manipulation unit, and may guide a rotation of the moving member as the manipulation unit may be moved up and down, the hook including a hook groove that is formed in an end thereof to be recessed.

According to an embodiment of the invention, the hook groove may be defined by a first inclined surface that may be inclined at a predetermined angle to form a first end of the hook groove, a second inclined surface that may be spaced apart from and parallel to the first inclined surface to form a second end of the hook groove, and a connecting surface that may connect the first inclined surface with the second inclined surface.

According to an embodiment of the invention, the moving member may rotate counterclockwise if the manipulation unit pushes the first inclined surface while moving up, and may rotate clockwise if the manipulation unit pushes the connecting surface while moving down.

According to an embodiment of the invention, the moving member may include a rotary-guide protrusion that may protrude from a first side thereof to be accommodated in the casing, so that the moving member may rotate on a given course, thus allowing the opening and closing unit to be smoothly operated.

According to an embodiment of the invention, the connecting member may include an intermediate portion inclined in a direction from an upper position to a lower position; an upper end extending straightly from the intermediate portion upwards; and a lower end extending straightly from the intermediate portion downwards, whereby such a configuration may secure a space for opening the door and may reduce a space occupied by the opening and closing unit in the casing.

According to an embodiment of the invention, the lower end may include a first connecting-protrusion receiving groove connected with the moving member, and the upper end may include a second connecting-protrusion receiving groove connected with the door.

According to an embodiment of the invention, the connecting member may rotate clockwise to cause the door to open the opening if the manipulation unit moves up and thereby the moving member rotates counterclockwise, and the connecting member may rotate counterclockwise to cause the door to close the opening if the manipulation unit moves down and thereby the moving member rotates clockwise.

According to an embodiment of the invention, the connecting member may include a rotating-axis protrusion that may protrude from a rotation center thereof to be received in the casing, so that the connecting member may rotate on a given course, thus allowing the opening and closing unit to be smoothly operated.

According to an embodiment of the invention, the multipurpose opening and closing device may further include a fixing unit provided in the casing to support the manipulation unit, thus preventing the manipulation unit from deviating from a moving course.

According to an embodiment of the invention, the fixing unit may include a manipulation-protrusion fixing piece that may be vertically formed on the moving course of the manipulation unit to receive the manipulation protrusion, so that, when the manipulation unit moves up and down, the manipulation protrusion may be supported and guided by the manipulation-protrusion fixing piece, thus preventing the manipulation unit from deviating from the moving course.

According to an embodiment of the invention, the fixing unit may further include a guide-protrusion fixing piece that may be vertically formed on the moving course of the manipulation unit to receive the guide protrusion protruding from the first side of the manipulation unit, so that, when the manipulation unit moves up and down, the guide protrusion may be supported and guided by the guide-protrusion fixing piece, thus preventing the manipulation unit from deviating from the moving course.

According to an embodiment of the invention, the fixing unit may further include a rubber member that may be vertically formed on the moving course of the manipulation unit to receive the manipulation protrusion, and the rubber member may include a pair of wings having elasticity to press a side surface of the manipulation protrusion, so that the manipulation protrusion may be fixed by the wings and thereby may not be shaken, thus allowing the manipulation unit to smoothly move up and down.

Advantageous Effects

The present invention may obtain the following effects by the above embodiments and the configuration, coupling, and use that will be described below.

As is apparent to the above description, the multipurpose opening and closing device of the present invention is advantageous in that a structure where an opening is opened or closed by an opening and closing unit operated in conjunction with a manipulation unit is simplified, thus reducing failure in the device, in addition to enabling easy repair.

The multipurpose opening and closing device of the present invention is advantageous in that it is designed to minimize a space occupied by an opening and closing unit in a casing, thus enabling efficient use of an interior space of the casing.

Further, the multipurpose opening and closing device of the present invention is advantageous in that a manipulation unit is fixed by a fixing unit, so that the manipulation unit is smoothly operated without deviating from a moving course.

The multipurpose opening and closing device of the present invention is advantageous in that it reduces the number of parts required to operate a manipulation unit and an opening and closing unit, so that it is easy to repair the device and a manufacturing cost thereof is low.

BEST MODE

Figure 1:
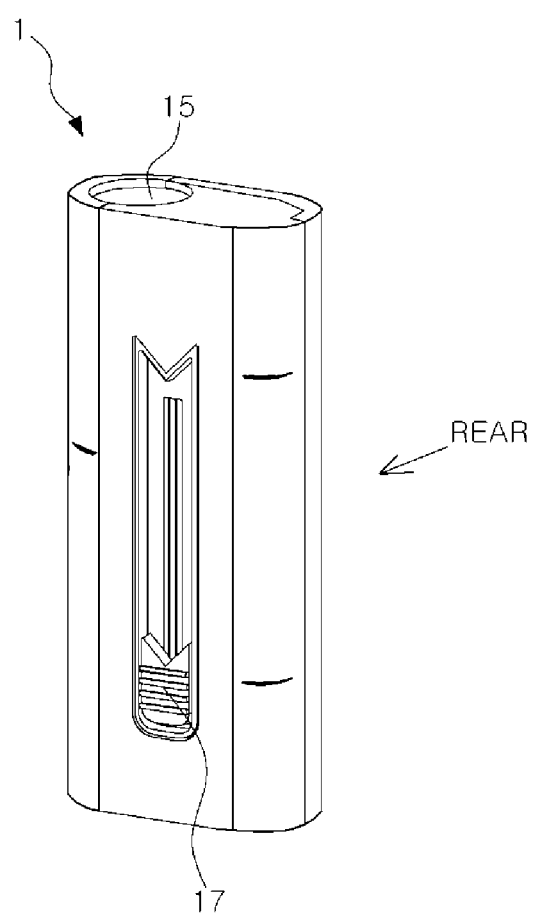
FIG. 1 is a perspective view illustrating a multipurpose opening and closing device according to an embodiment of the present invention.

Hereinafter, preferred embodiments of the present invention will be described in detail with reference to the accompanying drawings. The present invention may be modified in various different forms without being limited to embodiments described below. The embodiments of the present invention are provided to help those skilled in the art completely understand the invention. Thus, the shape of elements in the drawings may be exaggerated for the sake of clarity.

Further, when describing the embodiments of the present invention, the position and movement of each component are defined in the direction shown by arrows of the drawings and are separately defined in the context as necessary.

Referring to FIGS. 1 to 10, a multipurpose opening and closing device 1 according to an embodiment of the present invention includes a casing 10 having an opening 15, a manipulation unit 30 moved up and down in the casing 10 by a user's manipulation, an opening and closing unit 70 operated in conjunction with the up-and-down movement of the manipulation unit 30 to open or close the opening 15, and a fixing unit 50 preventing the manipulation unit 30 from deviating from a course when it moves up and down. The device simplifies a structure where the opening is opened or closed by the opening and closing unit 70 operated in conjunction with the manipulation unit 30, thus reducing failure in the device, enabling easy repair, and enabling efficient use of an interior space of the casing 10.

Figure 2:
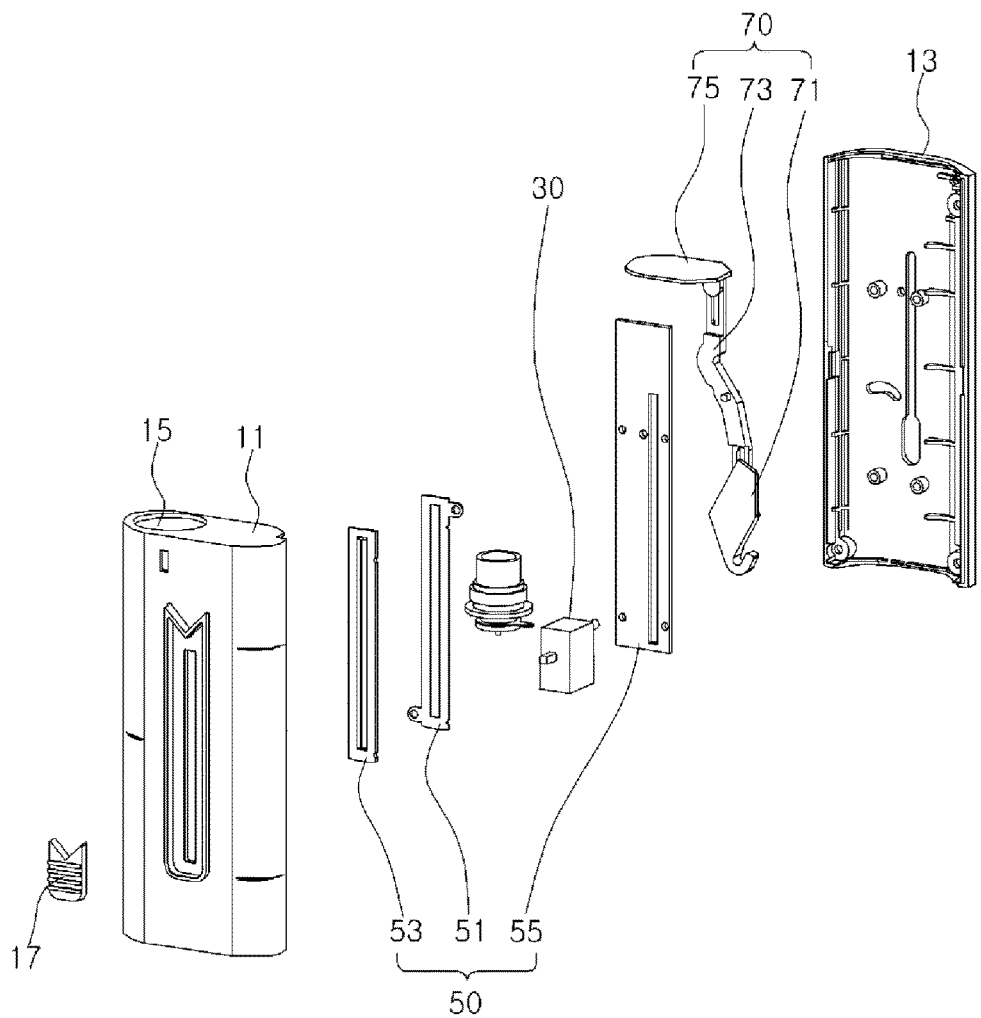
FIG. 2 is an exploded perspective view illustrating the multipurpose opening and closing device.

Referring to FIG. 2, a coupling relation of components of the multipurpose opening and closing device 1 will be described. The device includes the casing 10 at an outermost position, with the manipulation unit 30, the fixing unit 50, the opening and closing unit 70, and a cover 90 being provided in the casing 10.

The casing 10 is configured to define an appearance of the multipurpose opening and closing device 1. The casing has a predetermined shape, preferably a cylindrical shape. The casing includes a front casing 11, a rear casing 13, the opening 15, and a manipulation lever 17.

Figure 3:
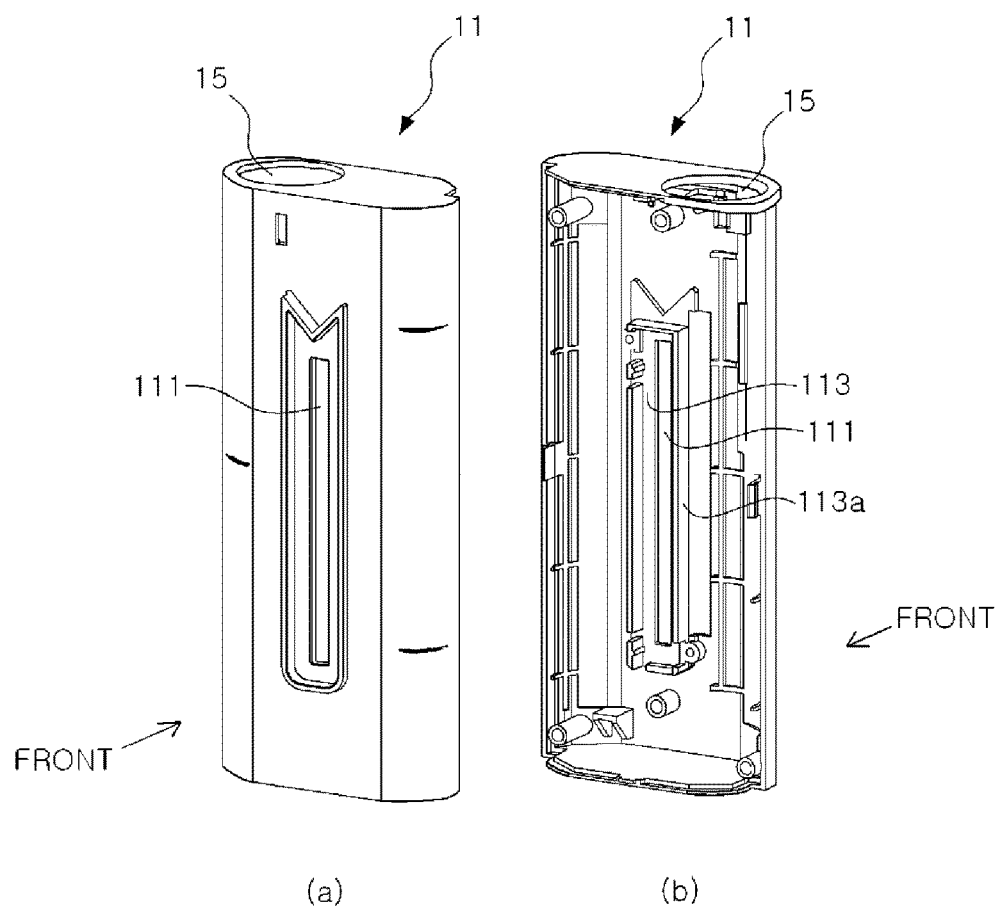
FIG. 3 is a perspective view illustrating a front casing of the multipurpose opening and closing device.

As shown in FIG. 3 (FIG. 3a is a perspective view of the front casing 11 when seen from the front, and FIG. 3b is a perspective view of the front casing 11 when seen from the rear), the front casing 11 is combined with the rear casing 13 to define the casing 10, and includes a manipulation-protrusion groove 111 and a fixing-unit receiving groove 113.

The manipulation-protrusion groove 111 is penetrated vertically through the front casing 11 to receive a manipulation protrusion 33 of the manipulation unit 30.

The fixing-unit receiving groove 113 is a space that accommodates a rubber member 53 and a manipulation-protrusion fixing piece 51 of the fixing unit 50, and is formed by a fixing-unit receiving step 113a protruding inwards from the front casing 11 to include an area that is larger than an outer circumference of the manipulation-protrusion groove 111. The fixing-unit receiving groove 113 may preferably be a space of a rectangle that is long in a vertical direction.

The opening 15 is penetrated through a top of the casing 10, and has a predetermined shape, preferably a circular shape. It is possible for an article to be put into or taken out from the multipurpose opening and closing device 1 through the opening 15. The opening 15 is opened or closed by the opening and closing unit 70 that is operated in conjunction with the up-and-down movement of the manipulation unit 30.

Figure 4:
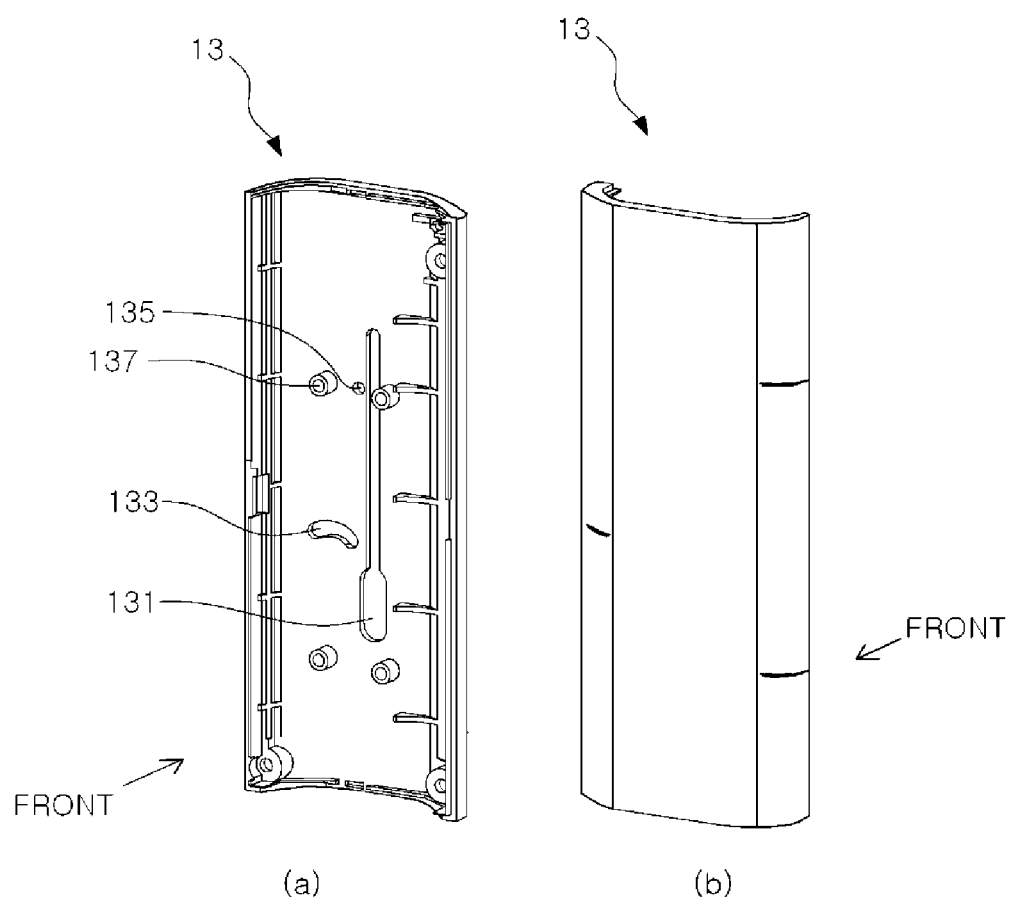
FIG. 4 is a perspective view illustrating a rear casing of the multipurpose opening and closing device.

As shown in FIG. 4 (FIG. 4a is a perspective view of the rear casing 13 when seen from the front, and FIG. 4b is a perspective view of the rear casing 13 when seen from the rear), the rear casing 13 is combined with the front casing 11 to defined the casing 10, and includes a bent-protrusion groove 131, a rotary-guide protrusion groove 133, a rotating-axis protrusion groove 135, and a fixing protrusion 137.

The bent-protrusion groove 131 is formed to be long in the vertical direction of the rear casing 13 to receive the bent protrusion 37 of the manipulation unit 30.

The rotary-guide protrusion groove 133 is formed on the rear casing 13 in a curved shape to be spaced apart from the bent-protrusion groove 131 at a predetermined interval, and receives a rotary-guide protrusion 713 of the opening and closing unit 70.

The rotating-axis protrusion groove 135 is formed on the rear casing 13 to be spaced apart from the bent-protrusion groove 131 at a predetermined interval, and receives a rotating-axis protrusion 737 of the opening and closing unit 70.

The fixing protrusion 137 protrudes inwards from the rear casing 13, and is coupled with a guide-protrusion fixing piece 55 of the fixing unit 50.

The manipulation lever 17 receives the manipulation protrusion 33 in the state where the manipulation protrusion 33 of the manipulation unit 30 protrudes out through the manipulation-protrusion groove 111 of the front casing 11. A user may operate the manipulation lever 17 to move the manipulation unit 30.

Figure 5:
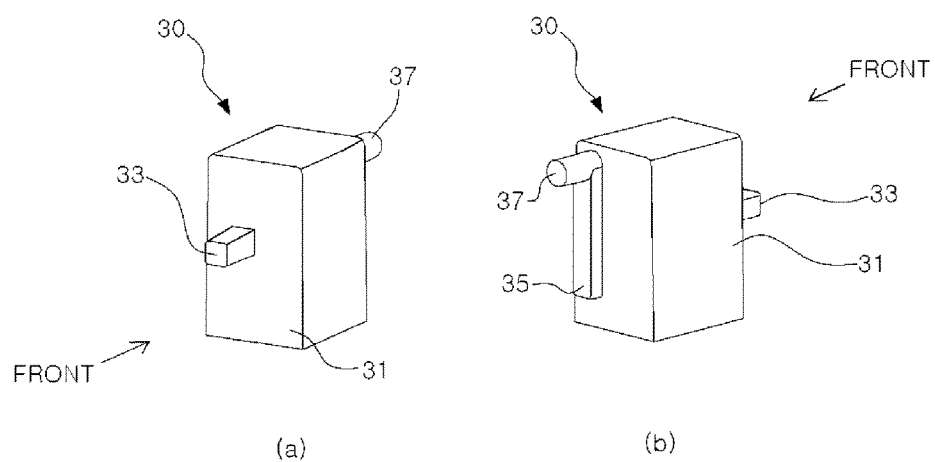
FIG. 5 is a perspective view illustrating a manipulation unit of the multipurpose opening and closing device.

As shown in FIG. 5 (FIG. 5a is a perspective view when seeing the manipulation unit 30 from the front, and FIG. 5b is a perspective view when seeing the manipulation unit 30 from the rear), the manipulation unit 30 is positioned in the casing 10 to move up and down, and includes a manipulation body 31, a manipulation protrusion 33, a guide protrusion 35, and a bent protrusion 37.

The manipulation body 31 is configured to be moved up and down in the casing 10 by a user's manipulation, and has a predetermined shape, preferably hexahedral shape.

The manipulation protrusion 33 protrudes from the front of the manipulation body 31, and protrudes through the manipulation-protrusion groove 111 of the front casing 11 to an outside of the casing 10 to be coupled to the manipulation lever 17.

The guide protrusion 35 protrudes vertically from the rear of the manipulation body 31, and is received in the guide-protrusion fixing piece 55 of the fixing unit 50 to prevent the manipulation unit 30 from deviating from a moving course.

The bent protrusion 37 is bent and extends from an upper end of the guide protrusion 35, and is connected with the opening and closing unit 70 to rotate the opening and closing unit 70 when the manipulation unit 30 moves up and down.

If the manipulation unit 30 deviates from the moving course, the multipurpose opening and closing device 1 may not be operated normally. Thus, according to the present invention, the fixing unit 50 fixed to the casing 10 is configured to receive the manipulation unit 30.

Figure 6:
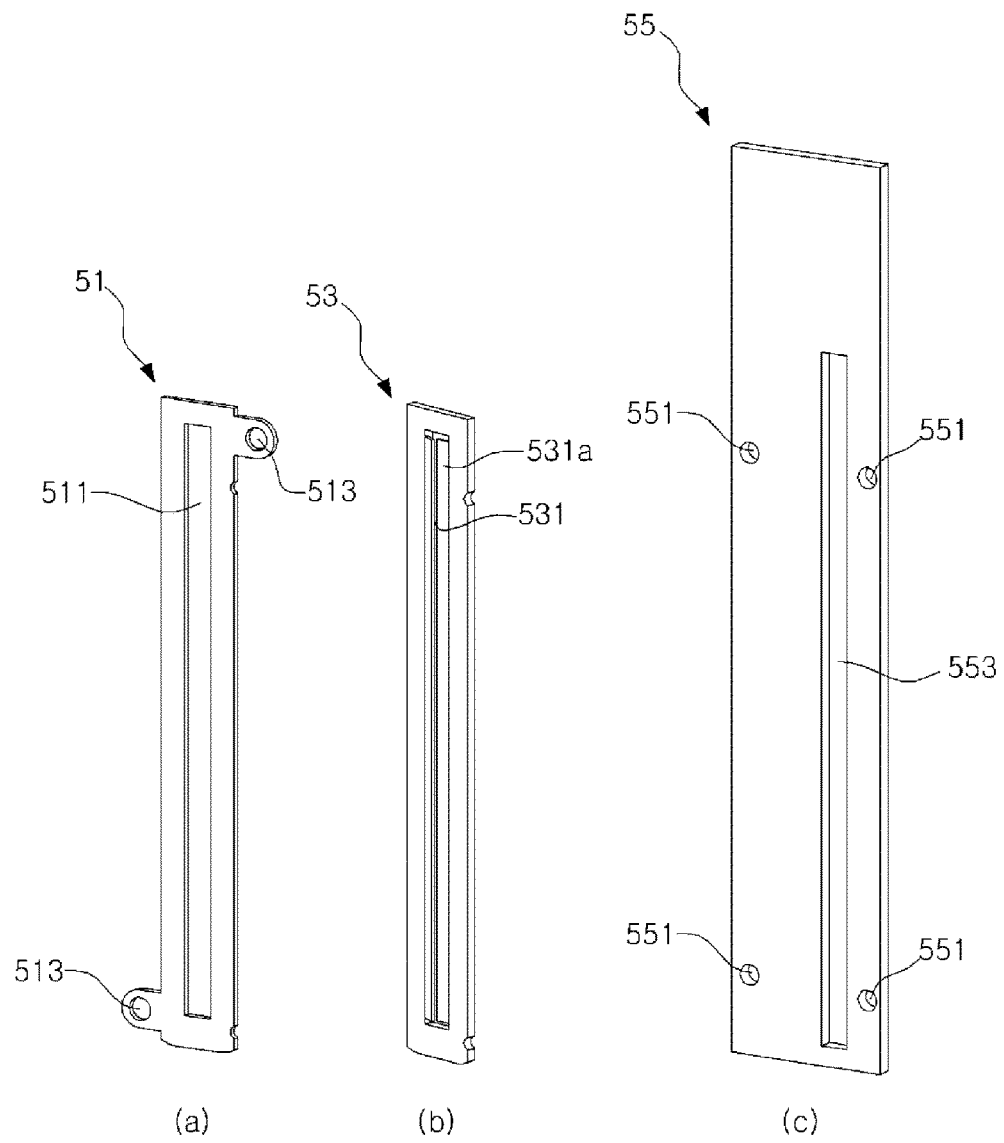
FIG. 6 is a perspective view illustrating a fixing unit of the multipurpose opening and closing device.

As shown in FIG. 6, the fixing unit 50 includes the manipulation-protrusion fixing piece 51, the rubber member 53, and the guide-protrusion fixing piece 55.

The manipulation-protrusion fixing piece 51 is received in the fixing-unit receiving groove 113 of the front casing 11 to be fixed to the interior of the casing 10, and is shaped to correspond to an inner circumference of the fixing-unit receiving groove 113. The manipulation-protrusion fixing piece includes a manipulation-protrusion receiving groove 511 that is penetrated vertically in the moving course of the manipulation protrusion 33, thus receiving the manipulation protrusion 33 and preventing the manipulation unit 30 from deviating from a given moving course.

Further, the manipulation-protrusion fixing piece 51 includes protrusions 513 formed at upper and/or lower positions to extend leftwards and/or rightwards, so that the manipulation-protrusion fixing piece 51 may be easily separated from the fixing-unit receiving groove 113 by raising the protrusions 513.

The rubber member 53 is located in front of the manipulation-protrusion fixing piece 51 to be received in the fixing-unit receiving groove 113, and is shaped to correspond to the inner circumference of the fixing-unit receiving groove 113. The rubber member covers the manipulation-protrusion groove 111 of the front casing 11, thus preventing foreign matter from entering the casing 10.

Figure 7:
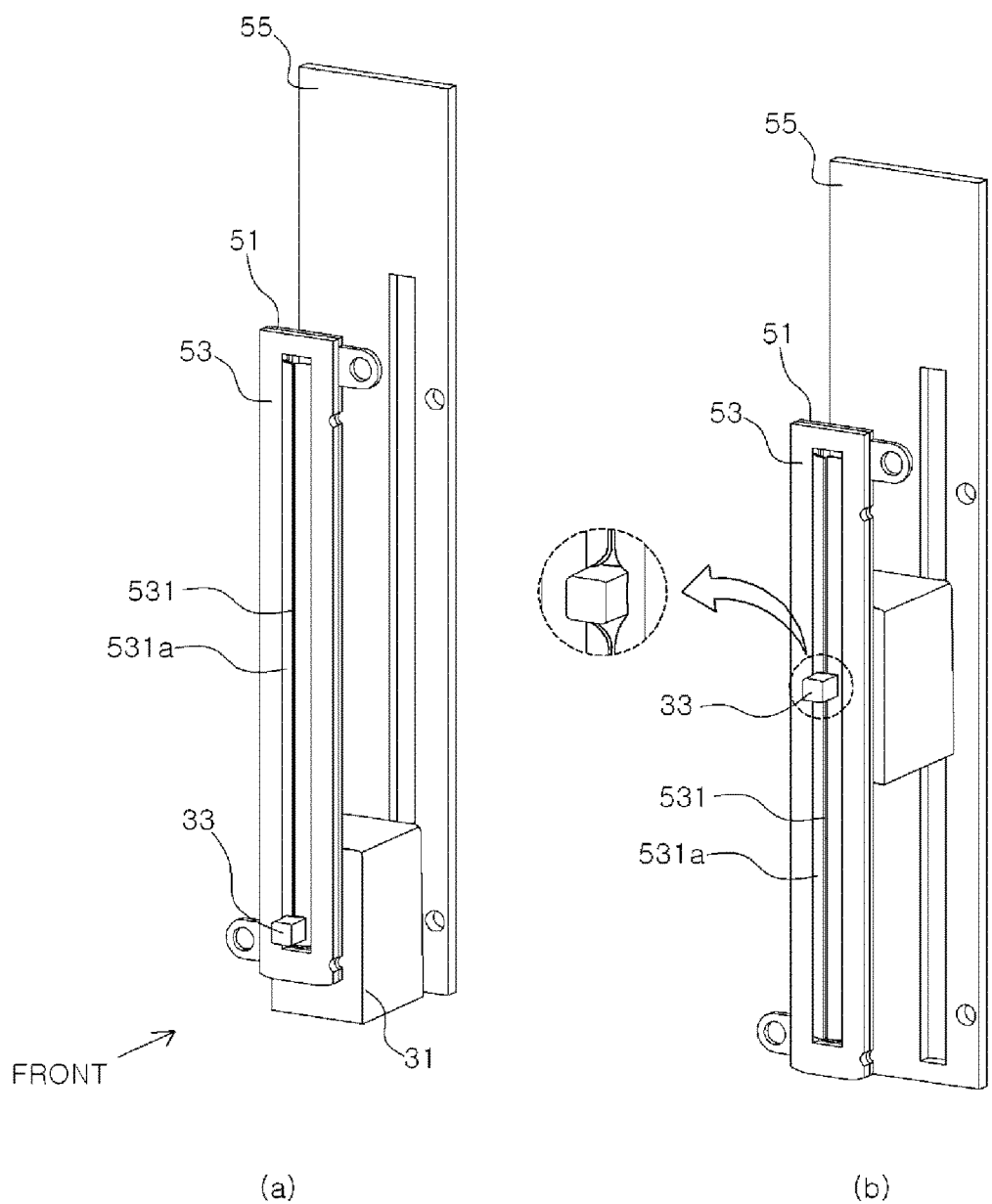
FIG. 7 is a perspective view illustrating a coupling structure of the manipulation unit with the fixing unit when seen from the front.

As shown in FIG. 7, the rubber member 53 includes a gap 531 in the moving course of the manipulation protrusion 33, so that the manipulation protrusion 33 protrudes out through the gap 531. Since the gap 531 is formed by a pair of wings 531a protruding in a front direction to be at a predetermined angle, the manipulation protrusion 33 easily protrudes to the outside through the gap 531.

Since the wings 531a have elasticity, they press a side of the manipulation protrusion 33, thus preventing the manipulation protrusion 33 from shaking during the up-and-down movement, securing the manipulation protrusion 33 to locate it at a center of the manipulation-protrusion groove 111 of the front casing 11, and thereby allowing the manipulation unit 30 to be easily moved up and down.

The guide-protrusion fixing piece 55 preferably has the shape of a rectangle that is long in the vertical direction, includes fixing-protrusion receiving holes 551, and is coupled with the fixing protrusion 137 of the rear casing 13 to be fixed to the interior of the casing 10. Further, the guide-protrusion fixing piece 55 includes a guide-protrusion receiving groove 553 that is vertically penetrated in the moving course of the guide protrusion 35 of the manipulation unit 30 to receive the guide protrusion 35, thus preventing the manipulation unit 30 from deviating from a given moving course.

Figure 8:
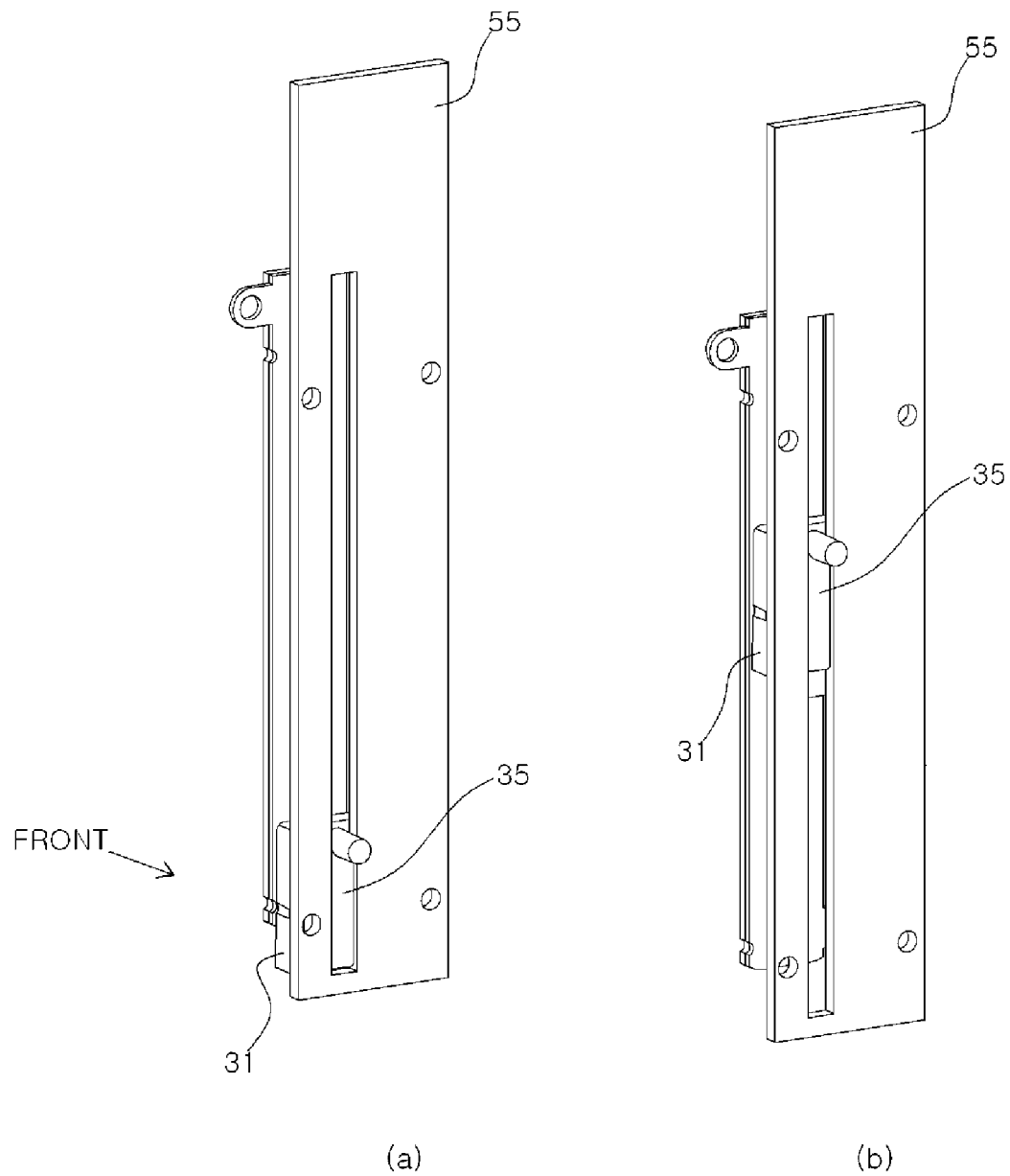
FIG. 8 is a perspective view illustrating the coupling structure of the manipulation unit with the fixing unit when seen from the rear.

The coupling relation between the manipulation unit 30 and the fixing unit 50 will be described with reference to FIGS. 7 and 8. The manipulation protrusion 33 protrudes out of the front casing 11 through the manipulation-protrusion fixing piece 51 and the rubber member 53 to move up and down. The guide protrusion 35 is received in the guide-protrusion fixing piece 55 to move up and down, so that the manipulation unit 30 does not deviate from a given moving course.

Figure 9:
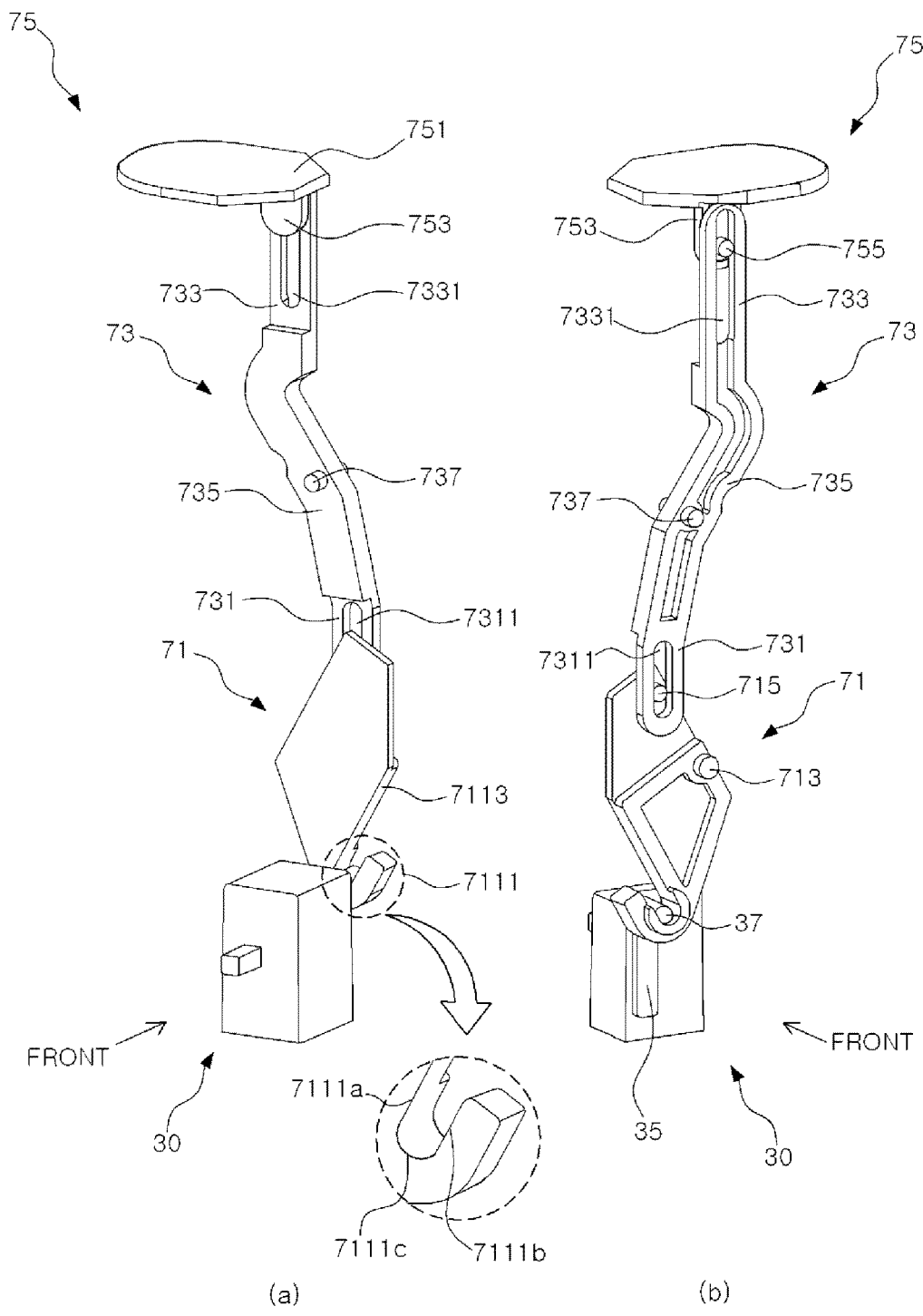
FIG. 9 is a perspective view illustrating an opening and closing unit of the multipurpose opening and closing device.

As shown in FIG. 9 (FIG. 9a is a perspective view when seeing the opening and closing unit 70 from the front, and FIG. 9b is a perspective view when seeing the opening and closing unit 70 from the rear, and the guide-protrusion fixing piece 55 is located between the manipulation unit 30 and the opening and closing unit 70 but is omitted in FIG. 9) the opening and closing unit 70 is operated in conjunction with the manipulation unit 30 to open or close the opening 15, and includes a moving member 71, a connecting member 73, and a door 75.

An upper end of the moving member 71 is coupled with the connecting member 73, and a lower end of the moving member 71 comes into contact with the bent protrusion 37. Thus, as the manipulation unit 30 moves up and down, the moving member is rotated to change the position of the connecting member 73 and the door 75 and thereby opens or closes the opening 15. The moving member 71 includes a hook 711, a rotary-guide protrusion 713, and a connecting protrusion 715.

Since the moving member 71 preferably has a diamond shape, it is possible to more sufficiently secure a space including the rotary-guide protrusion 713 and the connecting protrusion 715 as compared to taking a shape of a rectangle that is long in a longitudinal direction, and it is possible to more smoothly rotate even with a small space in the casing 10 as compared to a square shape.

The hook 711 has a 'J' shape by one long side and the other short side, is formed on a lower end of the moving member 71 to be bent, and includes a hook groove 7111 and an extending inclined surface 7113.

The hook groove 7111 is formed in an end of the hook 711 to receive the bent protrusion 37, and includes a first inclined surface 7111a, a second inclined surface 7111b, and a connecting surface 7111c.

The first inclined surface 7111a is connected with the extending inclined surface 7113 to constitute one side of the hook 711, and is formed to be inclined leftwards in a direction from an upper position to a lower position. The second inclined surface 7111b constitutes the other side of the hook 711, and is spaced apart from and parallel to the first inclined surface 7111a. The connecting surface 7111c connects the first inclined surface 7111a with the second inclined surface 7111b, and is preferably formed in a curved shape.

The extending inclined surface 7113 has the same gradient as the first inclined surface 7111a in the same direction, and extends from the first inclined surface 7111a to form one side of the hook 711.

If the manipulation unit 30 moves up, the bent protrusion 37 pushes the first inclined surface 7111a and the extending inclined surface 7113 in order. Thus, the moving member 71 rotates counterclockwise (hereinafter, the rotating direction of the opening and closing unit 70 is set to be clockwise or counterclockwise when seeing the multipurpose opening and closing device 1 from the front), and stops rotating when the first inclined surface 7111a and the extending inclined surface 7113 are located to be parallel to the up-and-down moving direction of the manipulation unit 30 and are not pushed any more.

The rotary-guide protrusion 713 is provided on the rear of the moving member 71 to protrude towards the rear casing 13, is inserted into the rotary-guide protrusion groove 133 of the rear casing 13 to guide the rotation of the moving member 71, and adjusts the length of the rotary-guide protrusion groove 133 to limit a rotation radius of the moving member 71.

The connecting protrusion 715 is provided on an upper end of the moving member 71 on the rear of the moving member 71 to protrude towards the rear casing 13, and is connected with the connecting member 73 to cause the connecting member 73 to rotate in conjunction with the rotation of the moving member 71.

The connecting member 73 is configured to transmit a rotating force generated by the rotation of the moving member 71 to the door 75, and includes a lower end 731, an upper end 733, an intermediate portion 735, and a rotating-axis protrusion 737.

The lower end 731 is configured to be connected with the moving member 71. The lower end extends straightly downwards from an end of the intermediate portion 735, and includes a first connecting-protrusion receiving groove 7311.

The first connecting-protrusion receiving groove 7311 is penetrated through a lower portion of the lower end 731, and is connected with the connecting protrusion 715 of the moving member 71. Thus, when the moving member 71 rotates, the connecting member 73 is rotated in a direction opposite to the rotating direction of the moving member 71.

The upper end 733 is connected to the door 75, extends straightly from the other side of the intermediate portion 735 upwards, and includes a second connecting-protrusion receiving groove 7331.

The second connecting-protrusion receiving groove 7331 is penetrated through an upper portion of the upper end 733 to be connected with the door 75. Thus, as the connecting member 73 rotates, the door 75 is moved to open or close the opening 15.

Figure 10:
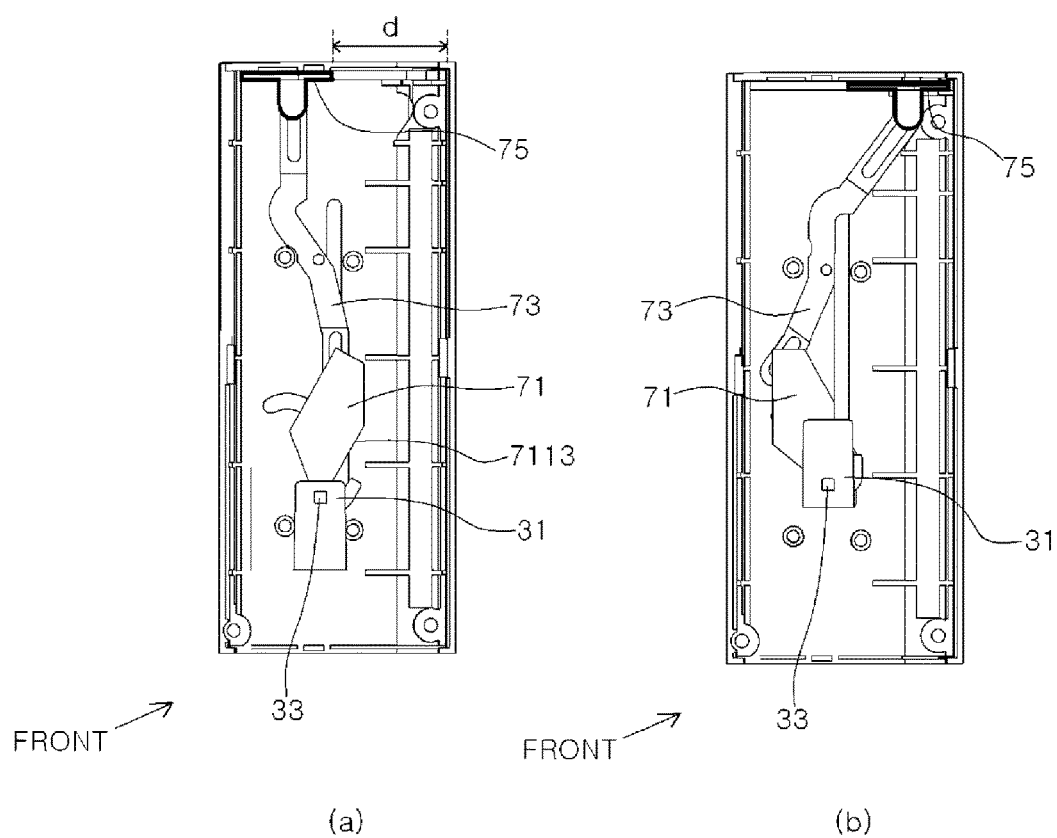
FIG. 10 is a view illustrating an operation of the multipurpose opening and closing device.

The intermediate portion 735 is configured to connect the upper end 733 with the lower end 731, and is formed to be inclined rightwards in a direction from an upper position to a lower position when seen from the front. The reason why the intermediate portion 735 is inclined as such is because it secures a space d required to open the door 75, as shown in FIG. 10.

Further, the reason why the upper end 733 and the lower end 731 extend straightly from the intermediate portion 735 upwards and downwards, respectively, is because such a configuration reduces a space occupied by the opening and closing unit 70 in the casing 10 while securing the space d, as compared to a case where the upper and lower ends extend with the same gradient as the intermediate portion 735.

The rotating-axis protrusion 737 protrudes forwards and rearwards at a rotation center of the connecting member 73. A portion of the rotating-axis protrusion 737 protruding forwards is coupled to the guide-protrusion fixing piece 55, and a portion of the rotating-axis protrusion 737 protruding rearwards is coupled to the rotating-axis protrusion groove 135 of the rear casing 13, so that the connecting member 73 rotates on the rotating-axis protrusion 737.

The door 75 is configured to open or close the opening 15 by the rotation of the connecting member 73, and includes a cover plate 751, an extension plate 753, and a connecting protrusion 755.

If the manipulation unit 30 moves down, the cover plate 751 covers the opening 15. If the manipulation unit 30 moves up, the cover plate opens the opening 15. The cover plate has a shape complementary to a cross-section of the casing 10, but is preferably smaller than the cross-section thereof because the cover plate opens or closes the opening 15 in the casing 10.

The extension plate 753 is provided under the cover plate 751 to extend towards the connecting member 73, and provides a space through which the connecting protrusion 755 may protrude.

Since the connecting protrusion 755 protrudes from a side of the extension plate 753 and is coupled to the second connecting-protrusion receiving groove 7331 of the connecting member 73, the cover plate 751 is moved by the rotation of the connecting member 73.

A process of opening or closing the opening 15 by the opening and closing unit 70 operated in conjunction with the manipulation unit 30 will be described in detail with reference to FIG. 10. For the convenience of description, the front casing 11 is omitted. FIG. 10a shows a state where the opening is closed, and FIG. 10b shows a state where the opening is open.

If a user moves the manipulation protrusion 33 up, the manipulation unit 30 moves up, so that the bent protrusion 37 pushes the first inclined surface 7111a and the extending inclined surface 7113 of the moving member 71, and consequently the moving member 71 is rotated counterclockwise. The rotary motion of the moving member 71 is guided by the rotary-guide protrusion 713.

As the moving member 71 rotates counterclockwise, the connecting member 73 connected to the moving member 71 via the connecting protrusion 715 rotates clockwise, and the connecting member 73 rotates on the rotating-axis protrusion 737.

As the connecting member 73 rotates clockwise, the door 75 connected to the connecting member 73 via the connecting protrusion 755 moves in a direction of opening the opening 15.

If a user moves the manipulation protrusion 33 down, the bent protrusion 37 pushes the connecting surface 7111c of the moving member 71, thus causing the moving member 71 to rotate clockwise.

As the moving member 71 rotates clockwise, the connecting member 73 connected to the moving member 71 via the connecting protrusion 715 rotates counterclockwise, and the door 75 moves in a direction of closing the opening 15 in conjunction with the rotation of the connecting member.

As described above, the multipurpose opening and closing device 1 opens or closes the opening 15 by the sequential rotation of the moving member 71, the connecting member 73, and the door 75 of the opening and closing unit 70, which is caused by the up-and-down movement of the manipulation unit 30. Therefore, this simplifies the internal structure to reduce failure in the device, enables easy repair, and allows the interior space of the casing 10 to be efficiently used.

The foregoing description is for illustrative purposes only. Further, the foregoing description is taken as a preferred embodiment of the present invention, and various combinations, changes and variations may be made in the present invention. That is, it is understood that all changes that fall within meets and bounds of the claims, or equivalence of such meets and bounds are intended to be embraced by the claims. The foregoing embodiment is intended to describe the best way to embody the technical idea of the present invention, and various changes may be made in the applicable field and use of the present invention. Therefore, the detailed description of the present invention is illustrative and not restrictive. Further, the appended claims should be interpreted to cover other embodiments.

The invention claimed is:

1. A multipurpose opening and closing device, comprising:
   a casing having an opening formed therein;
   a manipulation unit moved up and down in the casing by a user's manipulation; and
   an opening and closing unit operated in conjunction with an up-and-down movement of the manipulation unit to open or close the opening wherein the opening and closing unit comprises:
      a moving member rotated as the manipulation unit is moved up and down;
      a connecting member connected with the moving member;
      a door connected with the connecting member to open or close the opening as the connecting member rotates,
   wherein the moving member includes an upper end rotatably coupled with the connecting member and a lower end rotatably coupled with the manipulation unit,
   wherein the connecting member includes an upper end rotatably coupled with the door, a lower end rotatably coupled with the upper end of the moving member, and a rotating axis protrusion movably coupled with the casing, and wherein the connecting member is aligned with the moving member to be rotated in a direction opposite to a rotating direction of the moving member.

2. The multipurpose opening and closing device according to claim 1, wherein the manipulation unit comprises a bent protrusion that protrudes from a first side thereof and is operated in conjunction with the opening and closing unit to rotate the opening and closing unit.

3. The multipurpose opening and closing device according to claim 2, wherein the manipulation unit comprises a manipulation protrusion that protrudes from a second side thereof to be exposed to an outside of the casing, so that the manipulation unit is moved up and down in the casing as a user manipulates the manipulation protrusion.

4. The multipurpose opening and closing device according to claim 3, further comprising:
a fixing unit provided in the casing to support the manipulation unit, thus preventing the manipulation unit from deviating from a moving course.

5. The multipurpose opening and closing device according to claim 4, wherein the fixing unit comprises a manipulation-protrusion fixing piece that is vertically formed on the moving course of the manipulation unit to receive the manipulation protrusion, so that, when the manipulation unit moves up and down, the manipulation protrusion is supported and guided by the manipulation-protrusion fixing piece, thus preventing the manipulation protrusion from deviating from the moving course.

6. The multipurpose opening and closing device according to claim 5, wherein the fixing unit further comprises a guide-protrusion fixing piece that is vertically formed on the moving course of the manipulation unit to receive the guide protrusion protruding from the first side of the manipulation unit, so that, when the manipulation unit moves up and down, the guide protrusion is supported and guided by the guide-protrusion fixing piece, thus preventing the manipulation unit from deviating from the moving course.

7. The multipurpose opening and closing device according to claim 4, wherein the fixing unit further comprises a rubber member that is vertically formed on the moving course of the manipulation unit to receive the manipulation protrusion, and the rubber member comprises a pair of wings having elasticity to press a side surface of the manipulation protrusion, so that the manipulation protrusion is fixed by the wings and thereby is not shaken, thus allowing the manipulation unit to smoothly move up and down.

8. The multipurpose opening and closing device according to claim 1, wherein the moving member comprises a hook that is formed on the lower end thereof to be bent, is connected with the manipulation unit, and guides a rotation of the moving member as the manipulation unit is moved up and down, the hook comprising a hook groove that is formed in an end thereof to be recessed.

9. The multipurpose opening and closing device according to claim 8, wherein the hook groove is defined by a first inclined surface that is inclined at a predetermined angle to form a first end of the hook groove, a second inclined surface that is spaced apart from and parallel to the first inclined surface to form a second end of the hook groove, and a connecting surface that connects the first inclined surface with the second inclined surface.

10. The multipurpose opening and closing device according to claim 9, wherein the moving member rotates counterclockwise if the manipulation unit pushes the first inclined surface while moving up, and rotates clockwise if the manipulation unit pushes the connecting surface while moving down.

11. The multipurpose opening and closing device according to claim 1, wherein the rotating axis protrusion protrudes from a first side of the connecting member to be accommodated in the casing, so that the connecting member rotates the rotating axis protrusion, thus allowing the opening and closing unit to be smoothly operated.

12. The multipurpose opening and closing device according to claim 1, wherein the connecting member further comprises:
an intermediate portion inclined in a direction from an upper position to a lower position;
wherein the lower end of the connecting member extends straight down from the intermediate portion downwards, and the upper end of the connecting member extends straight up from the intermediate portion,
whereby such a configuration secures a space for opening the door and reduces a space occupied by the opening and closing unit in the casing.

13. The multipurpose opening and closing device according to claim 12, wherein the lower end of the connecting member comprises a first connecting-protrusion receiving groove connected with the moving member, and the upper end comprises a second connecting-protrusion receiving groove connected with the door.

14. The multipurpose opening and closing device according to claim 13, wherein the connecting member rotates clockwise to cause the door to open the opening if the manipulation unit moves up and thereby the moving member rotates counterclockwise, and the connecting member rotates counterclockwise to cause the door to close the opening if the manipulation unit moves down and thereby the moving member rotates clockwise.

15. The multipurpose opening and closing device according to claim 1, wherein the rotating-axis part is a protrusion that protrudes from a rotation center thereof to be received in the casing, so that the connecting member rotates on a given course, thus allowing the opening and closing unit to be smoothly operated.

16. The multipurpose opening and closing device according to claim 1, the moving member further including a rotary-guide part movably coupled with the casing to guide a rotation of the moving member and limit a rotation radius of the moving member.

17. The multipurpose opening and closing device according to claim 16, the casing further comprising a rotary-guide protrusion groove, wherein the rotary-guide part is movably coupled with the rotary-guide protrusion groove of the casing.

18. The multipurpose opening and closing device according to claim 17, wherein the rotary-guide protrusion groove is curved.

19. The multipurpose opening and closing device according to claim 1, the casing further comprising a rotating axis protrusion groove, wherein the rotating axis protrusion is movably couple with the rotating axis protrusion groove of the casing.

20. A multipurpose opening and closing device, comprising:
a casing having an opening formed therein;
a manipulation unit moved up and down in the casing by a user's manipulation; and
an opening and closing unit operated in conjunction with an up-and-down movement of the manipulation unit to open or close the opening, wherein the opening and closing unit comprises:

a moving member having an upper end and a lower end, the lower end of the moving member being connected to the manipulation unit;

a connecting member having an upper end and a lower end, the lower end of the connecting member rotatably coupled with the upper end of the moving member;

a door rotatably coupled with the upper end of the connecting member to open or close the opening as the connecting member rotates, wherein when the user's manipulation moves the manipulation unit up, the moving member rotates in a first direction, the connecting member rotates in a second direction, and the door opens.

21. The multipurpose opening and closing device according to claim 20, wherein the casing includes a first major plane and wherein the moving member and the connecting member are disposed in a second plane, the second plane being parallel to the first major plane of the casing.

* * * * *